DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 452

T905,002

ALCOHOL CONTAINING GASOLINES

William M. Bunting, 1311 N. Foster Drive 70806, and Clyde L. Aldridge, 6022 S. Pollard Parkway 70808, both of Baton Rouge, La.

Filed Sept. 30, 1971, Ser. No. 185,173

**Int. Cl. C10l *1/02***

U.S. Cl. 44—56

1 Sheet Drawing. 26 Pages Specification

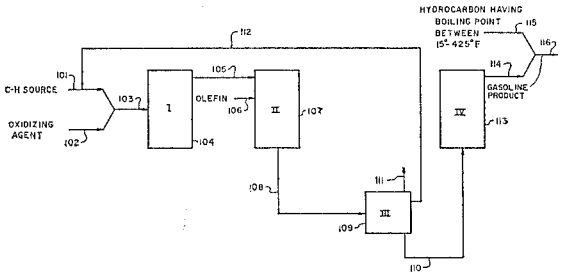

A gasoline having a high warm-up index blending value, as well as low vapor lock and RVP blending values can be produced by blending a hydrocarbon stream, a major portion of whose constituents have a boiling point between 15° and 425° F., with an alcohol mixture which is produced by contacting an oxygen-containing gas stream with a hydrocarbon stream comprising $C_4$ through $C_5$ hydrocarbons at temperatures and pressures sufficient to maintain a liquid phase and produce a hydroperoxide-rich stream, reacting in the presence of an epoxidation catalyst said hydroperoxide-rich stream with an olefin-containing stream comprising $C_3$ to $C_6$ olefins at temperatures between 75° and 400° F. to produce a mixture comprising alcohols and epoxides, and hydrogenating said mixture at temperatures up to 600° F. and pressures up to 3000 p.s.i.g. to produce the desired alcohol stream used in the blending.

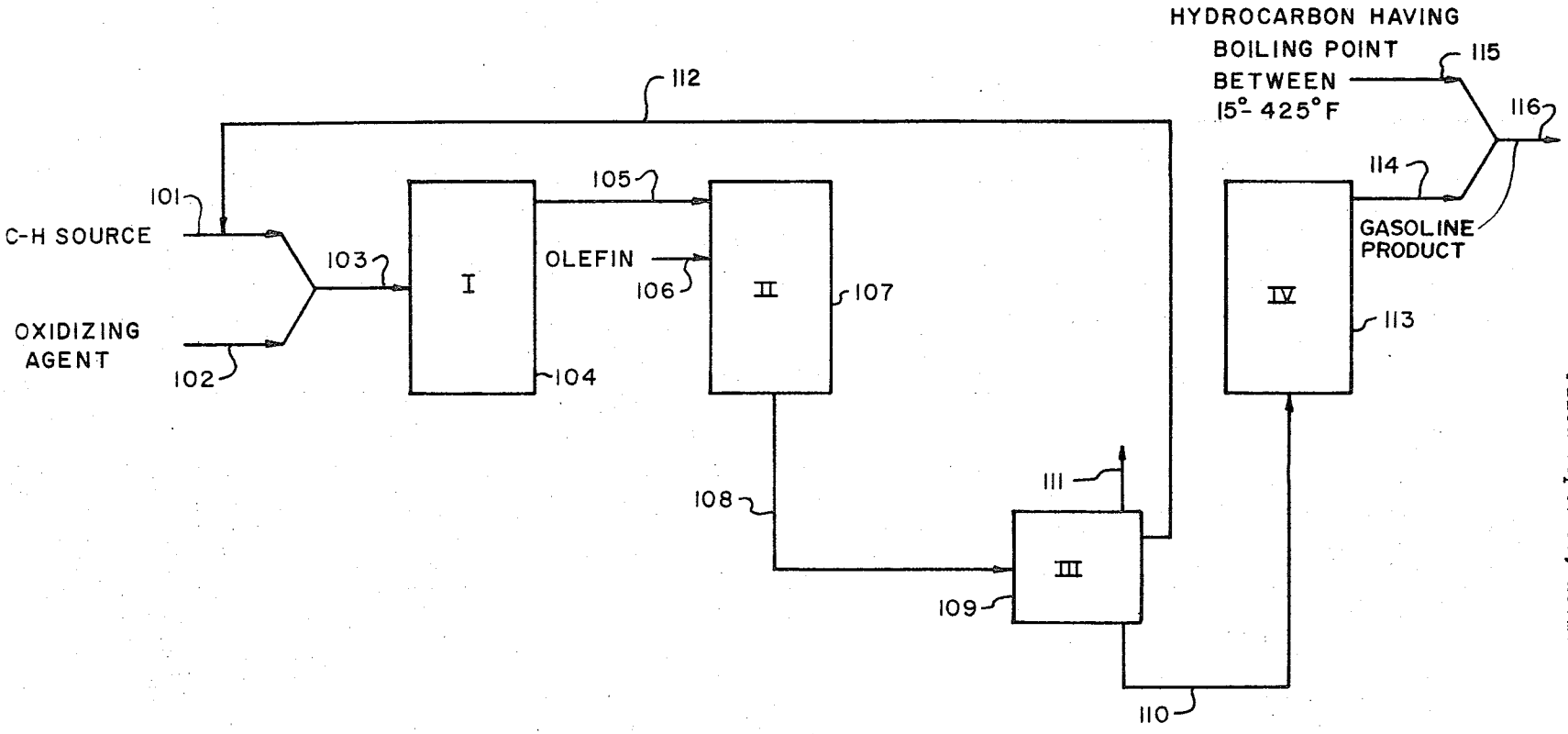

ALCOHOL CONTAINING GASOLINES
Filed Sept. 30, 1971